(12) United States Patent
Eason

(10) Patent No.: US 9,359,827 B2
(45) Date of Patent: Jun. 7, 2016

(54) HARDFACING COMPOSITIONS INCLUDING RUTHENIUM, EARTH-BORING TOOLS HAVING SUCH HARDFACING, AND RELATED METHODS

(71) Applicant: Baker Hughes Incorporated, Houston, TX (US)

(72) Inventor: Jimmy W. Eason, The Woodlands, TX (US)

(73) Assignee: Baker Hughes Incorporated, Houston, TX (US)

( * ) Notice: Subject to any disclaimer, the term of this patent is extended or adjusted under 35 U.S.C. 154(b) by 521 days.

(21) Appl. No.: 13/783,097

(22) Filed: Mar. 1, 2013

(65) Prior Publication Data

US 2014/0246248 A1    Sep. 4, 2014

(51) Int. Cl.
  *C23C 4/06*   (2006.01)
  *E21B 10/46*  (2006.01)
  *C23C 4/10*   (2016.01)
  *C22C 29/08*  (2006.01)
  *B24D 3/08*   (2006.01)

(52) U.S. Cl.
  CPC . *E21B 10/46* (2013.01); *C23C 4/06* (2013.01); *C23C 4/10* (2013.01); *B24D 3/08* (2013.01); *C22C 29/08* (2013.01); *C23C 4/129* (2016.01); *C23C 4/134* (2016.01)

(58) Field of Classification Search
  None
  See application file for complete search history.

(56) References Cited

U.S. PATENT DOCUMENTS

| | | | |
|---|---|---|---|
| 3,785,783 A * | 1/1974 | Mynard et al. | 428/557 |
| 4,574,011 A | 3/1986 | Bonjour et al. | |
| 5,658,678 A | 8/1997 | Stoll et al. | |
| 6,170,583 B1 | 1/2001 | Boyce | |
| 6,620,375 B1 | 9/2003 | Tank et al. | |
| 7,832,503 B2 | 11/2010 | Sand et al. | |
| 7,832,506 B2 | 11/2010 | Liang et al. | |
| 8,512,882 B2 * | 8/2013 | Bost et al. | 428/698 |
| 2002/0031440 A1 * | 3/2002 | Grearson et al. | 419/18 |
| 2008/0226943 A1 * | 9/2008 | Fang et al. | 428/697 |
| 2010/0044115 A1 | 2/2010 | Mirchandani | |
| 2011/0290566 A1 | 12/2011 | Mirchandani et al. | |
| 2012/0012402 A1 | 1/2012 | Thigpen et al. | |
| 2013/0084446 A1 | 4/2013 | Bao et al. | |

OTHER PUBLICATIONS

International Search Report for International Application No. PCT/US2014/019356 dated Jun. 23, 2014, 3 pages.
International Written Opinion for International Application No. PCT/US2014/019356 dated Jun. 23, 2014, 11 pages.
International Preliminary Report on Patentability for International Application No. PCT/US2014/019356 dated Sep. 1, 2015, 12 pages.

* cited by examiner

*Primary Examiner* — George Wyszomierski
*Assistant Examiner* — Ngoclan T Mai
(74) *Attorney, Agent, or Firm* — TraskBritt

(57) ABSTRACT

Hardfacing compositions include grains of hard material embedded within a cobalt-based metal alloy that includes ruthenium. Earth-boring tools include such hardfacing compositions on one or more surfaces thereof. Methods of applying hardfacing to an earth-boring tool include embedding grains of hard material in a molten cobalt-based metal alloy including ruthenium on a surface of an earth-boring tool, and cooling and solidifying the molten cobalt-based metal alloy with the grains of hard material embedded therein.

13 Claims, 5 Drawing Sheets

HARDFACING COMPOSITIONS INCLUDING RUTHENIUM, EARTH-BORING TOOLS HAVING SUCH HARDFACING, AND RELATED METHODS

TECHNICAL FIELD

Embodiments of the present disclosure generally relate to hardfacing compositions, to earth-boring tools including such hardfacing compositions, and to methods of forming hardfacing and applying hardfacing to surfaces of earth-boring tools.

BACKGROUND

Earth-boring tools are commonly used for forming (e.g., drilling and reaming) boreholes or wells (hereinafter "wellbores") in earth formations. Earth-boring tools include, for example, rotary drill bits, coring bits, eccentric bits, bicenter bits, reamers, underreamers, and mills.

Different types of earth-boring rotary drill bits are known in the art including, for example, fixed-cutter bits (which are often referred to in the art as "drag" bits), rolling-cutter bits (which are often referred to in the art as "rock" bits), superabrasive-impregnated bits, and hybrid bits (which may include, for example, both fixed-cutters and rolling cutters). The drill bit is rotated and advanced into the subterranean formation. As the drill bit rotates, the cutters or abrasive structures thereof cut, crush, shear, and/or abrade away the formation material to form the wellbore.

The drill bit is coupled, either directly or indirectly, to an end of what is referred to in the art as a "drill string," which comprises a series of elongated tubular segments connected end-to-end that extends into the wellbore from the surface of the formation. Often, various tools and components, including the drill bit, may be coupled together at the distal end of the drill string at the bottom of the wellbore being drilled. This assembly of tools and components is referred to in the art as a "bottom-hole assembly" (BHA).

The drill bit may be rotated within the wellbore by rotating the drill string from the surface of the formation, or the drill bit may be rotated by coupling the drill bit to a downhole motor, which is also coupled to the drill string and disposed proximate the bottom of the wellbore. The downhole motor may comprise, for example, a hydraulic Moineau-type motor having a shaft, to which the drill bit is attached, that may be caused to rotate by pumping fluid (e.g., drilling mud or fluid) from the surface of the formation down through the center of the drill string, through the hydraulic motor, out from nozzles in the drill bit, and back up to the surface of the formation through the annular space between the outer surface of the drill string and the exposed surface of the formation within the wellbore.

The materials of earth-boring tools need to be relatively hard and wear-resistant to avoid excessive wear during use of the tools. In an effort to increase wear-resistance of earth-boring tools, composite materials have been applied to the surfaces of drill bits that are subjected to abrasion, erosion, or to both abrasion and erosion. These composite materials are often referred to as "hardfacing" materials. Hardfacing materials typically include grains of hard material embedded within a continuous matrix phase. The continuous matrix phase generally comprises a metal alloy, and is often referred to in the art as a metal "binder," as it binds the grains of hard material together.

For example, hardfacing materials often include tungsten carbide particles dispersed throughout an iron-based, nickel-based, or cobalt-based metal alloy matrix. The tungsten carbide particles are relatively hard compared to the matrix material, and the matrix material is relatively tough compared to the tungsten carbide particles.

Tungsten carbide particles used in hardfacing materials may comprise one or more of cast tungsten carbide particles, sintered tungsten carbide particles, and macrocrystalline tungsten carbide particles. The tungsten carbide system includes two stoichiometric compounds, WC and $W_2C$. Cast tungsten carbide generally includes a eutectic mixture of the WC and $W_2C$ compounds. Sintered tungsten carbide particles include relatively smaller particles of WC bonded together by a matrix material. Cobalt and cobalt alloys are often used as matrix materials in sintered tungsten carbide particles. Finally, macrocrystalline tungsten carbide particles generally consist of single crystals of WC.

Various techniques known in the art may be used to apply hardfacing to a surface of an earth-boring tool. For example, automated and manual welding processes may be used to apply hardfacing to an earth-boring tool. In some manual processes, a welding rod that comprises the hardfacing is provided, and a torch (e.g., an oxyacetylene torch or an arc-welding torch) is used to heat an end of the rod and, optionally, the surface of the tool to which the hardfacing is to be applied. The end of the rod is heated until at least the matrix material begins to melt. As the matrix material at the end of the rod begins to melt, the melting hardfacing is applied to the surface of the tool. The hard particles dispersed within the matrix material are also applied to the surface with the molten matrix material. After application, the molten matrix material is allowed to cool and solidify.

Such welding rods may comprise a substantially solid, cast rod of the hardfacing, or they may comprise a hollow, cylindrical tube formed from the matrix material of the hardfacing and filled with hard particles (e.g., tungsten carbide particles). In welding rods of the tubular configuration, at least one end of the hollow, cylindrical tube may be sealed. The sealed end of the tube then may be melted or welded onto the desired surface on the earth-boring tool. As the tube melts, the tungsten carbide particles within the hollow, cylindrical tube mix with the molten matrix material as it is deposited onto the surface of the tool. An alternative technique involves forming a cast rod of the hardfacing.

Flame spray processes are also used to apply hardfacings to earth-boring tools. In a flame spray process, a powder comprising the hard particles and particles of the matrix material is carried by a pressurized fluid (e.g., a pressurized gas) to a nozzle. The powder mixture is sprayed out from the nozzle and through a flame toward the surface of the tool to which the hardfacing is to be applied. The flame causes the particles of matrix material to at least partially melt. As the material is sprayed onto the tool, the molten matrix material cools and solidifies, and the hard particles become embedded in the matrix material to form the hardfacing on the surface of the tool.

Various types of arc welding processes are known in the art and may be used to apply hardfacing to a surface of an earth-boring tool. For example, metal-inert gas (MIG) welding processes, tungsten-inert gas (TIG) welding processes, and plasma-transferred arc (PTA) welding processes may be used to apply hardfacing to a surface of an earth-boring tool.

BRIEF SUMMARY

In some embodiments, the present disclosure includes a hardfacing composition comprising a cobalt-based metal alloy including ruthenium (e.g., at least about 5.0 wt % ruthenium), and grains of hard material embedded within the cobalt-based metal alloy.

In additional embodiments, the present disclosure includes an earth-boring tool comprising a body, and at least one hardfacing material disposed on a surface of the body. The at least one hardfacing material comprises a cobalt-based metal alloy including ruthenium (e.g., at least about 5.0 wt % ruthenium), and grains of hard material embedded within the cobalt-based metal alloy.

In yet further embodiments, the present disclosure includes a method of applying a hardfacing composition to a surface of an earth-boring tool. In accordance with the method, grains of hard material are embedded in a molten cobalt-based metal alloy including ruthenium (e.g., at least about 5.0 wt % ruthenium) on a surface of an earth-boring tool, and the molten cobalt-based metal alloy is cooled and solidified with the grains of hard material embedded therein.

BRIEF DESCRIPTION OF THE DRAWINGS

While the specification concludes with claims particularly pointing out and distinctly claiming what are regarded as embodiments of the disclosure, various features and advantages of this disclosure may be more readily ascertained from the following description of example embodiments provided with reference to the accompanying drawings, in which:

DETAILED DESCRIPTION

The illustrations presented herein are not actual views of any particular earth-boring tool, cutting element, or component thereof, but are merely idealized representations that are employed to describe embodiments of the present disclosure.

As used herein, the term "earth-boring tool" means and includes any tool used to remove formation material and form a bore (e.g., a wellbore) through the formation by way of the removal of the formation material. Earth-boring tools include, for example, rotary drill bits (e.g., fixed-cutter or "drag" bits and roller cone or "rock" bits), hybrid bits including both fixed-cutters and roller elements, coring bits, percussion bits, bicenter bits, reamers (including expandable reamers and fixed-wing reamers), and other so-called "hole-opening" tools.

Conventional cemented tungsten carbide materials are widely used in earth-boring tools due to their high hardness and high wear-resistance. Cemented tungsten carbide materials typically include grains of tungsten carbide cemented within a cobalt-based metal alloy matrix material (which typically does not include ruthenium in any significant quantity). Such cemented tungsten carbide materials are typically formed using pressing and sintering processes in which tungsten carbide particles and particles of cobalt-based metal alloy are mixed together (optionally with additives such as organic binders), pressed to form a green body, and then sintered at elevated temperatures (and, optionally, elevated pressures). The sintering process is typically carried out at or near a melting point of the cobalt-based metal matrix material.

The tungsten carbide phase in cemented tungsten carbide materials exhibits high hardness and wear-resistance, but tungsten carbide is a ceramic and is relatively brittle. The cobalt-based metal matrix material is not as hard or wear-resistant as the tungsten carbide, but is tougher and exhibits higher fracture toughness. Thus, a cobalt-cemented tungsten carbide material having a higher percentage of cobalt-based metal matrix material will exhibit a higher fracture toughness and a lower wear resistance compared to a cobalt-cemented tungsten carbide material having a lower percentage of cobalt-based metal matrix material. Conversely, a cobalt-cemented tungsten carbide material having a higher percentage of tungsten carbide will exhibit a higher wear resistance and a lower fracture toughness compared to a cobalt-cemented tungsten carbide material having a lower percentage of tungsten carbide. The size of the tungsten carbide grains in a cemented tungsten carbide material also affects wear resistance and fracture toughness, with smaller tungsten carbide grains resulting in higher wear resistance and lower fracture toughness, and larger tungsten carbide grains resulting in lower wear resistance and higher fracture toughness.

Figure 1:
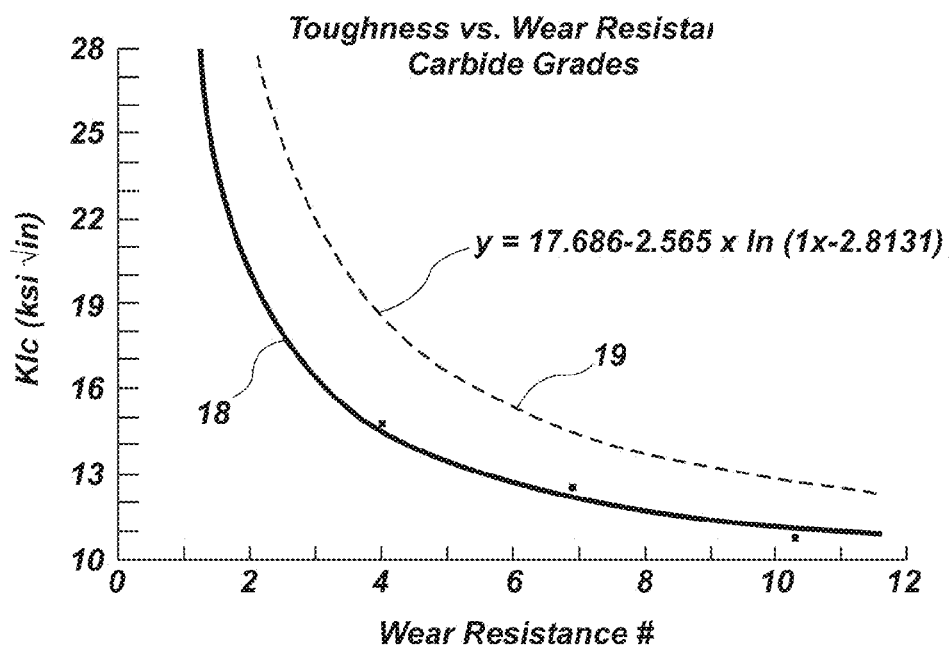
FIG. 1 is a graph illustrating the relationship between fracture toughness and wear-resistance generally exhibited by grades of cobalt-cemented tungsten carbide materials.

Referring to FIG. 1, it has been found that conventional cobalt-cemented tungsten carbide materials typically exhibit a relationship between wear resistance and fracture toughness shown by the line 18 in FIG. 1. In other words, a cobalt-cemented tungsten carbide material may be formulated to have any desirable tungsten carbide grain size and percentages of tungsten carbide and cobalt-based metal matrix material. The resulting cobalt-cemented tungsten carbide material will typically exhibit a fracture toughness y (when tested according to, for example, ASTM B-771) and a wear resistance number x (when tested according to, for example, ASTM B-611) that fall along the line 18 in FIG. 1.

It has been discovered, however, that the inclusion of ruthenium in a cobalt-based metal alloy matrix material of such a cemented tungsten carbide material may exhibit improved wear resistance, while at the same time exhibiting improved fracture toughness. In other words, a cobalt-cemented tungsten carbide material (formed by pressing and sintering) that includes a cobalt-based metal alloy 14 in which tungsten carbide grains are embedded may exhibit a fracture toughness $K_{Ic}$ of y and a wear resistance number of x, wherein x and y fall above and/or to the right of the line 19 in FIG. 1. The line 19 may have the equation of y=17.686−2.565*ln(|x−2.813|). Thus, in accordance with embodiments of the present disclosure, a cemented tungsten carbide material having a cobalt-based metal alloy matrix material including ruthenium may exhibit exhibiting a fracture toughness $K_{Ic}$ of y and a wear resistance number of x, wherein y≥17.686−2.565*ln(|x−2.813|), at least for wear resistance numbers of between 3.0 and 10.0.

Thus, as examples, some embodiments of cemented tungsten carbide materials having a cobalt-based matrix including ruthenium, as disclosed herein in further detail below, may exhibit a wear resistance number of at least about 4.0 and a fracture toughness $K_{Ic}$ of at least about 18.0 ksi√in, and other embodiments of such cemented tungsten carbide materials may exhibit a wear resistance number of at least about 6.0 and a fracture toughness $K_{Ic}$ of at least about 15.0 ksi√in. Conventional cobalt-cemented tungsten carbides that do not include ruthenium in the matrix material do not simultaneously exhibit such values of fracture toughness and wear resistance. In accordance with embodiments of the present disclosure, such materials may be employed as, or in, hardfacing compositions, as described herein below with reference to FIGS. 3 and 4.

Figure 2:
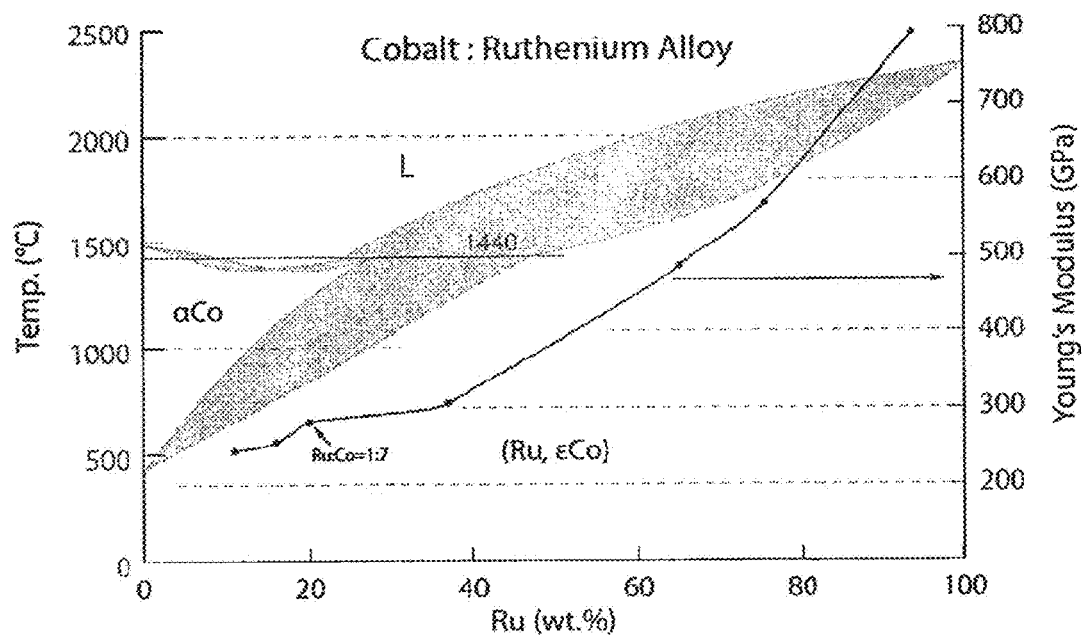
FIG. 2 is cobalt-ruthenium phase diagram, further including a graph of Young's modulus as a function of ruthenium content in the cobalt-ruthenium system.

FIG. 2 is a phase diagram of the cobalt-ruthenium system. A graph of Young's modulus as a function of weight percent ruthenium in a cobalt-ruthenium alloy is also superimposed over the phase diagram. As shown in FIG. 2, there is a discontinuity in the curve of the Young's modulus at approximately the composition corresponding to an atomic ratio of ruthenium to cobalt of 1:7. At this atomic ratio, it is believed that the hexagonal crystal structure is stabilized, and compositions at this ratio (and higher ruthenium content) will have a hexagonal crystal structure, while compositions at lower ratios (and lower ruthenium content) will have a cubic crystal structure.

Figure 3:
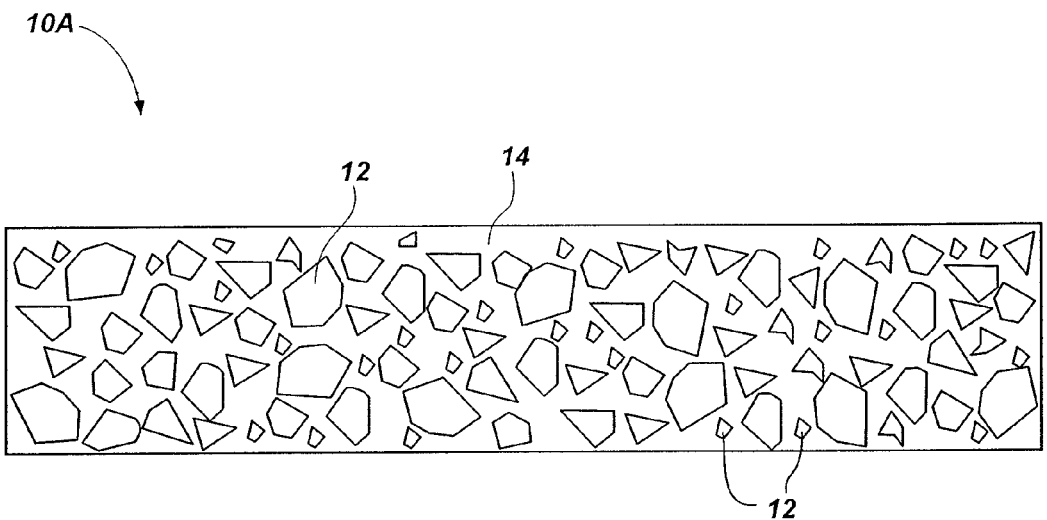
FIG. 3 is a simplified drawing of an embodiment of a hardfacing material of the present disclosure, which includes a discontinuous hard phase in a cobalt-based metal alloy matrix that includes ruthenium.

FIG. 3 is a simplified drawing illustrating an embodiment of a hardfacing composition 10A of the present disclosure. The hardfacing composition 10A is a composite material that includes grains of hard material 12 embedded within a cobalt-based metal alloy 14 that includes ruthenium. Thus, the grains of hard material 12 form discontinuous or "dispersed" grains of hard material 12 of the hardfacing composition 10A, and the cobalt-based metal alloy 14 forms a continuous matrix phase of the hardfacing composition 10A. The grains of hard material 12 exhibit a hardness higher than a hardness exhibited by the cobalt-based metal alloy 14, and the cobalt-based metal alloy 14 exhibits a fracture toughness higher than a fracture toughness exhibited by the grains of hard material 12.

The cobalt-based metal alloy 14 of the hardfacing composition 10A includes ruthenium. In some embodiments, the cobalt-based metal alloy 14 may include at least about 5.0 wt % ruthenium, and may include between about 5.0 wt % ruthenium and about 45.0 wt % ruthenium, or even between about 20.0 wt % ruthenium and about 45.0 wt % ruthenium.

Cobalt-based metal alloys typically used in cemented tungsten carbide typically have a cubic crystalline structure. As previously mentioned, the presence of ruthenium in the cobalt-based metal alloy 14 may serve to stabilize the hexagonal crystal structure of the cobalt-based metal alloy 14. Thus, in some embodiments, the grains of the cobalt-based metal alloy 14 may have a hexagonal crystal structure, and may exhibit a Young's modulus of at least about 250 GPa, at least about 260 GPa, or even at least about 270 GPa.

The grains of hard material 12 may comprise, for example, at least one of a transition metal carbide, a transition metal nitride, a transition metal oxide. As a non-limiting example, the grains of hard material 12 may comprise tungsten carbide (e.g., particles of sintered tungsten carbide, cast tungsten carbide, or macrocrystalline tungsten carbide).

In some embodiments, the cobalt-based metal alloy 14 that includes ruthenium may comprise between about 10.0 wt % and about 50.0 wt % of the hardfacing composition 10A, with the remainder of the hardfacing composition 10A being at least substantially comprised by the grains of hard material 12.

Figure 4:
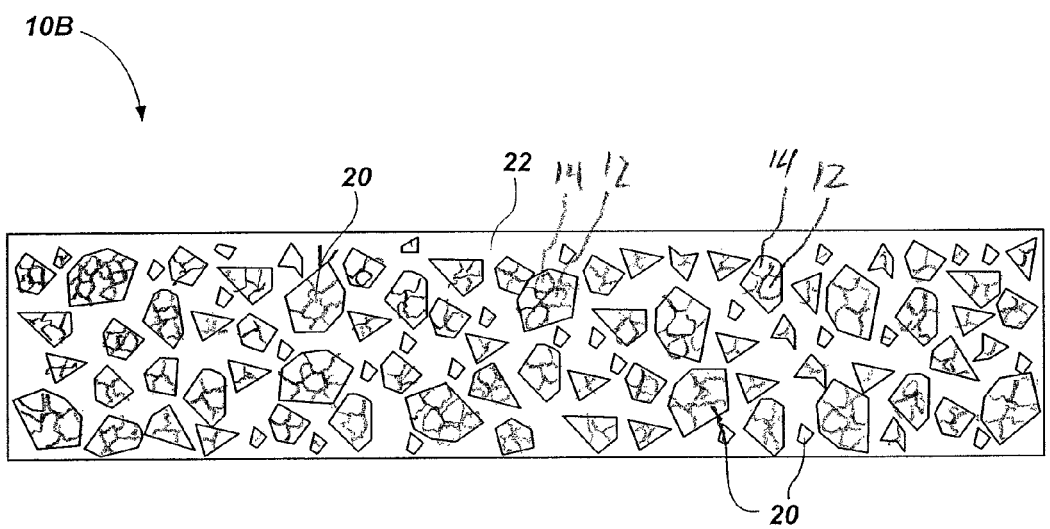
FIG. 4 is a simplified drawing of an embodiment of a hardfacing material of the present disclosure, which includes particles comprising a discontinuous hard phase in a first cobalt-based metal alloy matrix that includes ruthenium, the particles disposed in a second, continuous metal matrix phase.

FIG. 4 is a simplified drawing illustrating an additional embodiment of a hardfacing composition 10B of the present disclosure. The hardfacing composition 10B includes particles 20 that include grains of hard material 12 embedded within a cobalt-based metal alloy 14 that includes ruthenium, and the particles 20 are disposed within a second, continuous metal alloy matrix phase 22. The grains of hard material 12 and the cobalt-based metal alloy 14 that includes ruthenium may be as described with reference to FIG. 4. In the particles 20, however, the cobalt-based metal alloy 14 that includes ruthenium may comprise between about 3.0 wt % and about 20.0 wt % of the particles 20, with the remainder of the particles 20 being at least substantially comprised by the grains of hard material 12. The particles 20 may be formed by pressing and sintering a particle mixture that includes particles comprising the grains of hard material 12 and particles comprising the cobalt-based metal alloy 14 to form a sintered body. The sintered body then may be broken apart, crushed, and/or subjected to a grinding process to form the particles 20.

The second, continuous metal alloy matrix phase 22 may comprise, for example, an iron-based alloy, a cobalt-based alloy, a nickel-based alloy, a copper-based alloy, an aluminum-based alloy, etc. In some embodiments, the second, continuous metal alloy matrix phase 22 also may comprise a cobalt-based metal alloy that includes ruthenium as previously described in relation to the cobalt-based metal alloy 14. In some embodiments, the second, continuous metal alloy matrix phase 22 may have the same chemical composition as the cobalt-based metal alloy 14.

Hardfacing compositions 10A, 10B as described herein may be applied to surfaces of earth-boring tools using various methods. For example, automated and manual welding processes may be used to apply a hardfacing composition 10A, 10B to a surface of an earth-boring tool. Various types of arc welding processes may be used to apply a hardfacing composition 10A, 10B to a surface of an earth-boring tool. For example, metal-inert gas (MIG) welding processes, tungsten-inert gas (TIG) welding processes, and plasma-transferred arc (PTA) welding processes may be used to apply hardfacing composition 10A, 10B to a surface of an earth-boring tool. Flame spray processes also may be used to apply hardfacing composition 10A, 10B to surfaces of earth-boring tools. In such methods, grains of hard material 12 may be embedded in a molten cobalt-based metal alloy 14 that includes ruthenium on a surface of an earth-boring tool, and the molten cobalt-based metal alloy 14 may be cooled and solidified with the grains of hard material 12 embedded therein.

Additional embodiments of the present disclosure include material compositions and structures that may be used to form a hardfacing composition 10A, 10B on an earth-boring tool. Such material compositions and structures also include a cobalt-based metal alloy 14 including ruthenium, as described herein, and may further include hard particles used to form the grains of hard material 12 of the hardfacing composition 10A, 10B or hard particles 20 that comprise such grains of hard material 12. By way of example and not limitation, the cobalt-based metal alloy 14 including ruthenium may be incorporated into a welding rod, and the welding rod may be used to deposit a hardfacing composition 10A, 10B on a surface of an earth-boring tool.

Figure 5:
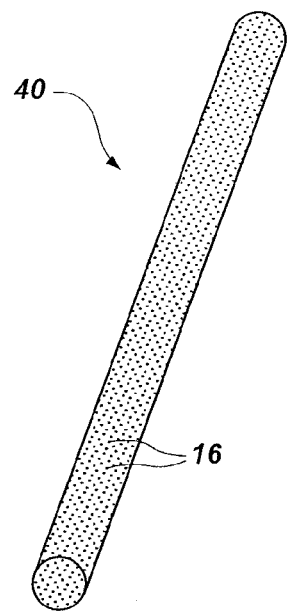
FIG. 5 is a perspective view of an embodiment of a welding rod of the present disclosure that includes hard particles and a cobalt-based metal alloy including ruthenium, as described herein.

FIG. 5 is a simplified perspective view of an embodiment of a solid welding rod 40 of the present disclosure. The solid welding rod 40 shown in FIG. 5 may comprise an at least substantially solid cylinder that includes hard particles 16 (FIG. embedded within a metal alloy that may ultimately form either the cobalt-based metal alloy 14 of the hardfacing composition 10A of FIG. 3, or the metal alloy matrix phase 22 of the hardfacing composition 10B of FIG. 4. Thus, the solid welding rod 40 includes an elongated, generally cylindrical body comprising the metal alloy, and the hard particles 16 are disposed and dispersed within the body. As the metal alloy of the welding rod 40 will ultimately form the cobalt-based metal alloy 14 of the hardfacing composition 10A or the metal alloy matrix phase 22 of the hardfacing composition 10B, the metal alloy of the welding rod 40 may have a material composition as previously described for the cobalt-based metal alloy 14 or the metal alloy matrix phase 22. The solid welding rod 40 may further comprise additional hard particles 16 which may comprise, for example, particles comprising a hard material 12 as described with reference to FIG. 3, or particles 20 as previously described with reference to FIG. 4. Thus, the hard particles 16 may include at least one of a transition metal carbide (e.g., tungsten carbide), a transition metal nitride, and a transition metal oxide. The solid welding rod 40 of FIG. 5 may be formed using, for example, a forging process, a casting process, or an extrusion process.

Figure 6A:
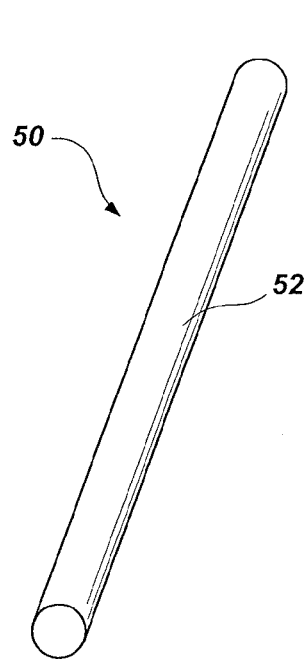
FIG. 6A is a perspective view of another embodiment of a welding rod of the present disclosure that includes hard particles and a cobalt-based metal alloy including ruthenium, as described herein.
Figure 6B:
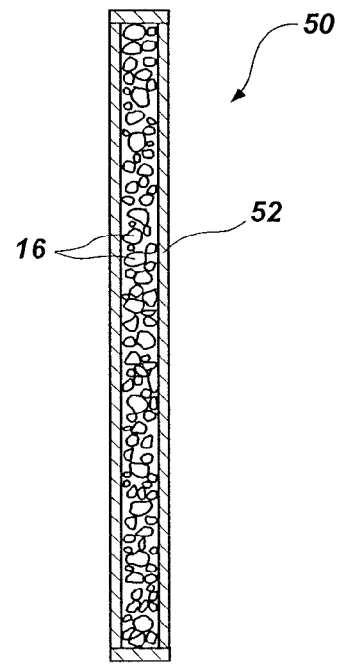
FIG. 6B is a longitudinal cross-sectional view of the welding rod shown in FIG. 6A.

FIG. 6A is a simplified perspective view of another embodiment of a tubular welding rod 50 of the present disclosure. The tubular welding rod 50 shown in FIG. 6A may comprise a generally hollow, cylindrical tube 52 that is at least substantially comprised by a metal or metal alloy that will be used to form either the cobalt-based metal alloy 14 of the hardfacing composition 10A of FIG. 3, or the metal alloy matrix phase 22 of the hardfacing composition 10B of FIG. 4. Thus, the metal or metal alloy of the tube 52 may have a material composition as previously described for the cobalt-based metal alloy 14 or the metal alloy matrix phase 22. FIG. 6B is a longitudinal cross-sectional view of the tubular welding rod 50 of FIG. 6A. As shown in FIG. 6B, the interior space within the hollow, cylindrical tube 52 may be filled with hard particles 16, which may be as described with reference to FIG. 5. One or both ends of the tube 52 may be capped, crimped, or otherwise sealed to prevent the hard particles 16 from falling out from the tube 52. Thus, the tubular welding rod 50 also includes an elongated, generally cylindrical tubular body comprising a metal alloy (i.e., tube 52), and the hard particles 16 are disposed within the body. The hollow, cylindrical tube 52 of the welding rod 50 of FIGS. 6A and 6B may be formed using, for example, a forging process, a casting process, or an extrusion process.

Embodiments of welding rods of the present disclosure (e.g., the solid welding rod 40 of FIG. 5 and the tubular welding rod 50 of FIGS. 6A and 6B) may be used to apply a hardfacing composition 10A, 10B to a surface of an earth-boring tool using a torch such as, for example, an oxyacetylene torch or an arc-welding torch. The torch is used to heat an end of the welding rod and, optionally, the surface of the earth-boring tool to which the hardfacing is to be applied. An end of the welding rod is heated until at least the matrix material in the welding rod begins to melt. As the matrix material at the end of the welding rod begins to melt, the melting matrix material, and hard particles 16 from the welding rod that become entrained within the melting matrix material, are applied to the surface of the earth-boring tool.

After application, the molten matrix material is allowed to cool and solidify on the surface of the earth-boring tool, and the hard particles 16 become embedded within the solidified matrix material. The resulting hardfacing composition 10A, 10B (FIGS. 3 and 4, respectively) includes a continuous matrix phase comprising a metal alloy, which is formed by the metal alloy of the welding rod, and grains of hard material 12 formed by, or disposed within, the hard particles 16 of the welding rod.

Additional embodiments of the present disclosure include powder feedstock mixtures for use in flame spray processes that include particles comprising a cobalt-based metal alloy including ruthenium. For example, a powder feedstock mixture for a flame spray process may comprise a mixture of particles comprising a cobalt-based metal alloy including ruthenium, as previously described herein, and hard particles 16. In a flame spray process, such a powder feedstock mixture may be entrained within and carried by a pressurized fluid (e.g., a pressurized gas) to a flame spray nozzle. The pressurized fluid and the powder mixture may be sprayed out from the nozzle and through a flame toward the surface of the earth-boring tool to which the hardfacing composition 10A, 10B is to be applied. The flame causes the particles of metal alloy to at least partially melt. As the powder mixture is sprayed onto the tool, the molten metal alloy cools and solidifies, and the hard particles 16 become embedded within the solidified metal alloy matrix material. The resulting hardfacing composition 10A, 10B (FIGS. 3 and 4, respectively) includes a continuous metal matrix phase (e.g., either the cobalt-based metal alloy 14 of FIG. 3, or the metal alloy matrix phase 22 of FIG. 4), which is formed by the particles of metal alloy in the powder feedstock mixture, and grains of hard material 12 formed by or disposed within the hard particles 16 in the powder feedstock mixture.

Additional embodiments of the present disclosure include earth-boring tools having a hardfacing composition 10A, 10B (as previously described herein in relation to FIGS. 3 and 4 and including a cobalt-based metal alloy 14 having ruthenium therein) on at least a portion of a surface of a body of the tools. The tools may also include at least one cutting element. By way of example and not limitation, earth-boring tools such as, for example, fixed-cutter rotary drill bits, roller cone rotary drill bits, diamond impregnated rotary drill bits, reamer tools, mills, and coring bits may include hardfacing composition 10A, 10B and may embody the present disclosure.

Figure 7:
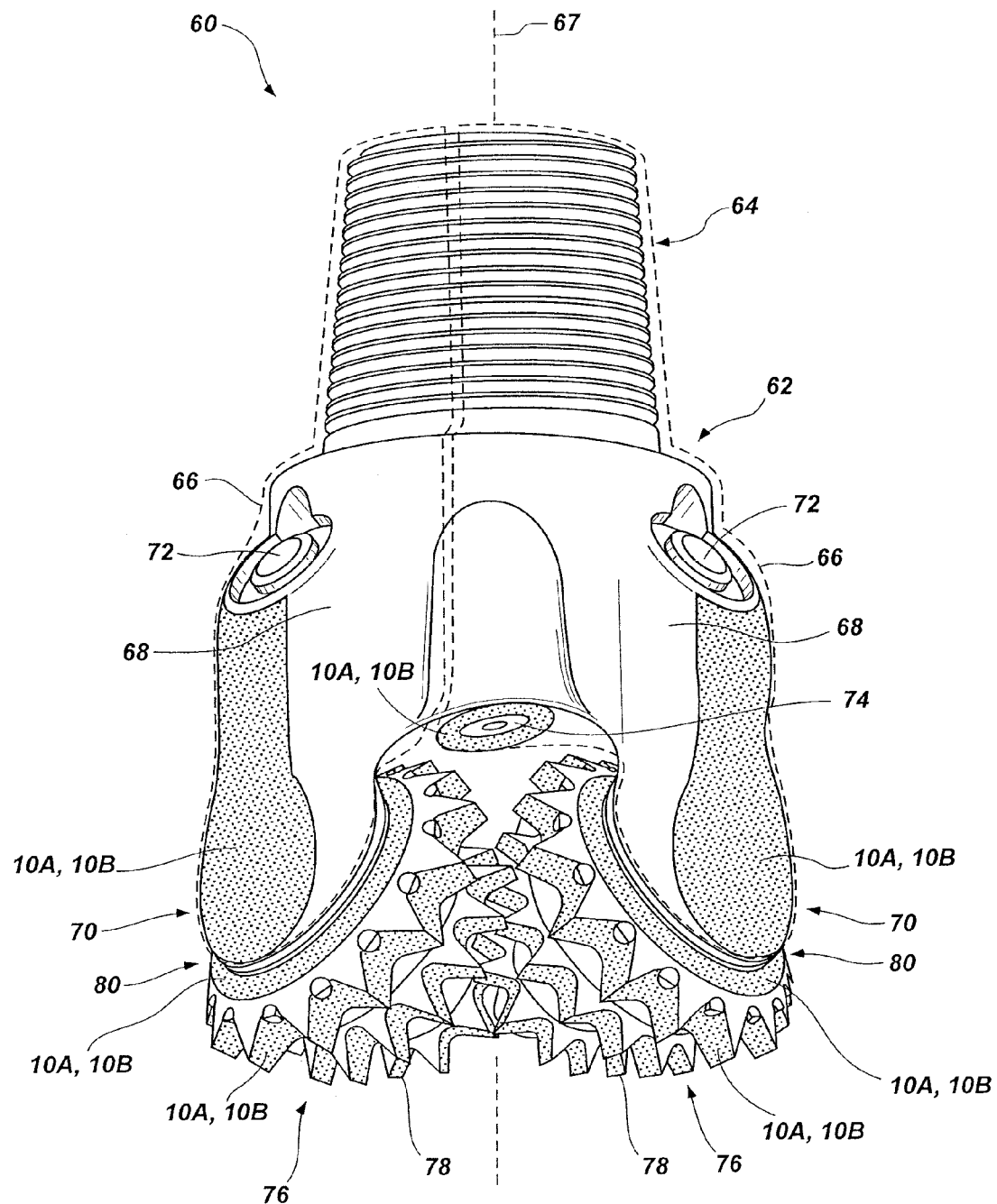
FIG. 7 is a side view of an embodiment of a roller cone earth-boring rotary drill bit of the present disclosure that includes a hardfacing material as described herein.

FIG. 7 illustrates an embodiment of a roller cone drill bit 60 of the present disclosure. The roller cone drill bit 60 includes a bit body 62 having threads 64 at its proximal longitudinal end for connection to a drill string (not shown). The bit body 62 may comprise a plurality (e.g., three) of head sections 66 (which are separated by the dotted lines in FIG. 7) that are welded together concentrically about a longitudinal axis 67 of the drill bit 60. The threads 64 may be machined in the conical shank region of the bit body 62 after welding together the head sections 66. Two of the head sections 66 are visible from the perspective of FIG. 7.

Each head section 66 comprises a head section body or proximal section 68 nearest the threads 64 and a bit leg 70 depending distally therefrom. Each upper section 68 of the drill bit 60 may include a lubricant fluid pressure compensator 72, as known in the art. At least one nozzle 74 may be provided in the bit body 62 for controlling the direction and velocity of pressurized drilling fluid flowing through the bit body 62 and out from the nozzle 74 during drilling operations. A roller cone cutter 76 is rotatably secured to a bearing shaft (not shown) of each respective bit leg 70 of bit body 62. By way of example, the drill bit 60 has three roller cone cutters 76, one of which is obscured from view from the perspective of FIG. 7. Each roller cone cutter 76 has rows of cutting elements 78. The cutting elements 78 may comprise cutting teeth, which may be machined in exterior surfaces of the bodies of the roller cone cutters 76. Alternatively, the cutting elements 78 may comprise separately formed inserts, which may be formed from a wear resistant material such as cemented tungsten carbide and pressed into recesses drilled or otherwise formed in exterior surfaces of the bodies of the roller cone cutters 76.

The roller cone drill bit 60 of FIG. 7 may include a hardfacing composition 10A, 10B on one or more surfaces of the drill bit 60. By way of example and not limitation, the outer surfaces of the head sections 66, including exterior surfaces of both the proximal sections 68 of the head sections 66 and the bit legs 70 of the head sections 66 may comprise a hardfacing composition 10A, 10B thereon. Furthermore, a hardfacing composition 10A, 10B may be provided on various surfaces of the roller cone cutters 76. For example, a hardfacing composition 10A, 10B may be provided on gage surfaces 80 of the roller cone cutters 76, on the cutting elements 78 (e.g., on cutting teeth), or on both the gage surfaces 80 and on the cutting elements 78. A hardfacing composition 10A, 10B also may be applied to surfaces of the drill bit 60 within the fluid passageways (not shown) extending through the drill bit 60, as well as to surfaces of the drill bit 60 proximate the nozzles 74, and other surfaces that might be susceptible to fluid erosion during drilling operations.

Figure 8:
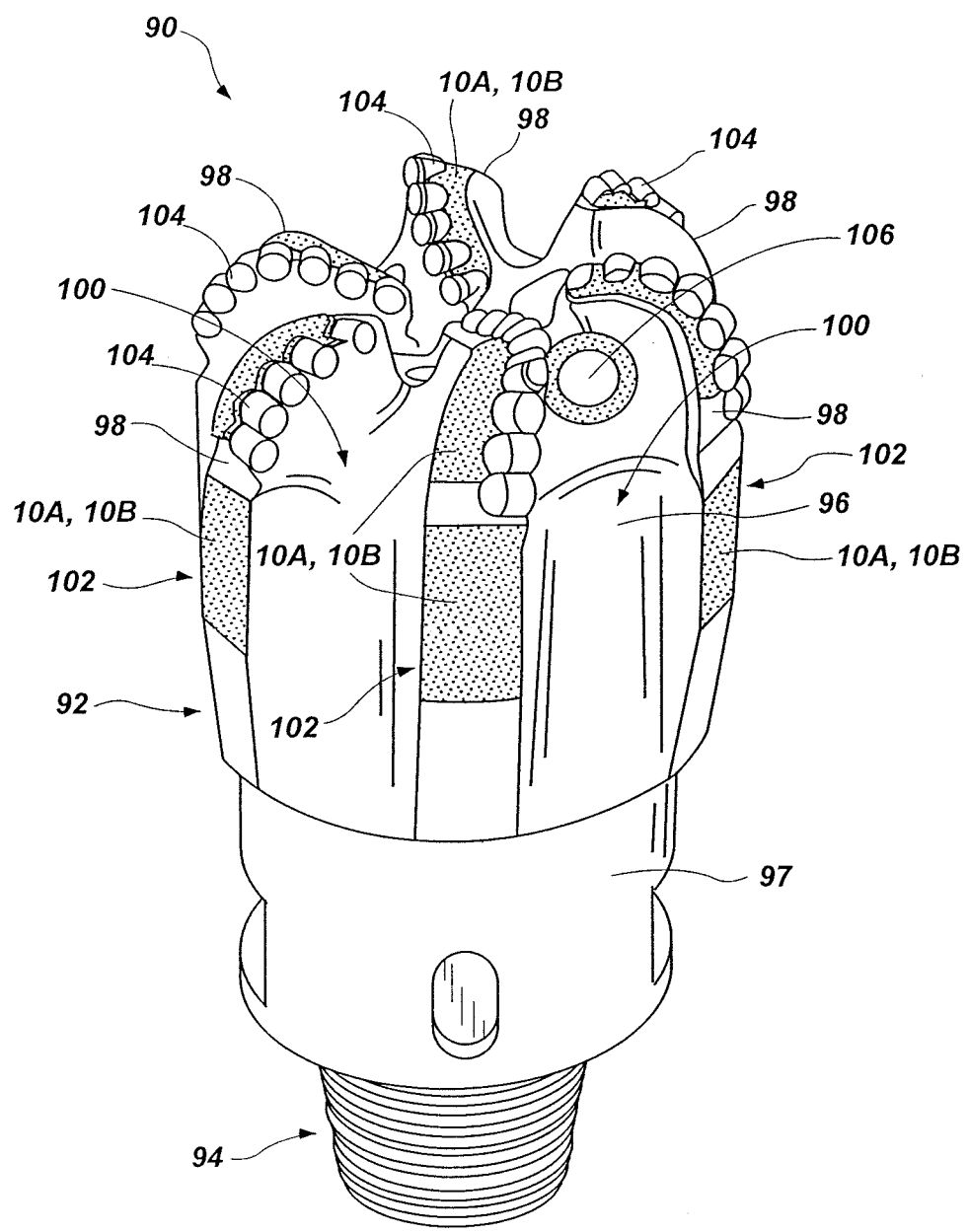
FIG. 8 is a perspective view of an embodiment of a fixed-cutter earth-boring rotary drill bit of the present disclosure that includes a hardfacing material as described herein.

FIG. 8 illustrates an embodiment of a fixed-cutter drill bit 90 of the present disclosure. The fixed-cutter drill bit 90 includes a bit body 92 having threads 94 at its proximal longitudinal end for connection to a drill string (not shown). The bit body 92 may comprise a crown 96, which may be formed from a particle-matrix composite material (e.g., a cemented tungsten carbide material) or a metal alloy (e.g., steel). The crown 96 may be attached to a shank 97, and the threads 94 may be machined in the shank 97.

The crown 96 of the drill bit 90 may comprise a plurality of blades 98 that are separated from one another by fluid passageways 100. The blades 98 may extend over the face of the crown 96 from a central cone region of the crown 96 to a gage region of the crown 96. Radially outer surfaces of the blades 98 in the gage region of the crown 96 comprise gage surfaces 102 of the drill bit 90. These gage surfaces 102 define the diameter of any wellbore drilled by the drill bit 90. The portions of the fluid passageways 100 between the blades 98 in the gage region of the crown 96 are often referred to in the art as "junk slots."

A plurality of cutting elements 104 may be fixedly attached to each of the blades 98. The cutting elements 104 may comprise, for example, PDC cutting elements. Fluid passageways (not shown) also extend through the drill bit 90 to nozzles 106 to allow drilling fluid to be pumped through the drill string (not shown) and the drill bit 90 and out the nozzles 106 during drilling operations.

The fixed-cutter drill bit 90 of FIG. 8 may include a hardfacing composition 10A, 10B on one or more surfaces of the drill bit 90. By way of example and not limitation, the gage surfaces 102 may comprise a hardfacing composition 10A, 10B thereon. Furthermore, a hardfacing composition 10A, 10B may be provided on various formation-engaging surfaces of the blades 98. A hardfacing composition 10A, 10B also may be applied to surfaces of the drill bit 90 within the fluid passageways (not shown) extending through the drill bit 90, as well as to surfaces of the drill bit 90 proximate the nozzles 106, and other surfaces that might be susceptible to fluid erosion during drilling operations.

Thus, surfaces of earth-boring tools such as, for example, the roller cone drill bit 60 of FIG. 7 and the fixed-cutter drill bit 90 of FIG. 8, may be hardfaced by bonding hard particles to the surfaces thereof using a cobalt-based metal alloy including ruthenium, as previously described herein.

Additional non-limiting example embodiments of the disclosure are set forth below.

Embodiment 1: A hardfacing composition, comprising: a cobalt-based metal alloy including at least about 5.0 wt % ruthenium; and grains of hard material embedded within the cobalt-based metal alloy.

Embodiment 2: The hardfacing composition of Embodiment 1, wherein the hardfacing composition exhibits a wear resistance number of at least about 4.0 and a fracture toughness $K_{Ic}$ of at least about 18.0 ksi√in.

Embodiment 3: The hardfacing composition of Embodiment 1, wherein the hardfacing material has a composition exhibiting a wear resistance number of at least about 6.0 and a fracture toughness $K_{Ic}$ of at least about 15.0 ksi√in.

Embodiment 4: The hardfacing composition of any one of Embodiments 1 through 3, wherein the hardfacing material has a composition exhibiting a fracture toughness $K_{Ic}$ of y and a wear resistance number of x, wherein $y \geq 17.686 - 2.565 * \ln(|x-2.813|)$.

Embodiment 5: The hardfacing composition of any one of Embodiments 1 through 4, wherein the cobalt-based metal alloy comprises between about 5.0 wt % ruthenium and about 45.0 wt % ruthenium.

Embodiment 6: The hardfacing composition of Embodiment 5, wherein the cobalt-based metal alloy comprises between about 20.0 wt % ruthenium and about 45.0 wt % ruthenium.

Embodiment 7: The hardfacing composition of any one of Embodiments 1 through 6, wherein grains of the cobalt-based metal alloy have a hexagonal crystal structure.

Embodiment 8: The hardfacing composition of any one of Embodiments 1 through 7, wherein between about 10.0 wt % and about 50.0 wt % of the hardfacing composition is comprised by the cobalt-based metal alloy.

Embodiment 9: The hardfacing composition of any one of Embodiments 1 through 8, wherein the grains of hard material comprise at least one of a transition metal carbide, a transition metal nitride, and a transition metal oxide.

Embodiment 10: The hardfacing composition of any one of Embodiments 1 through 9, wherein the grains of hard material comprise tungsten carbide.

Embodiment 11: An earth-boring tool, comprising: a body; and at least one hardfacing material disposed on a surface of the body, the at least one hardfacing material comprising a cobalt-based metal alloy including at least about 5.0 wt % ruthenium, and grains of hard material embedded within the cobalt-based metal alloy.

Embodiment 12: The earth-boring tool of Embodiment 11, wherein the at least one hardfacing material has a composition exhibiting a wear resistance number of at least about 4.0 and a fracture toughness $K_{Ic}$ of at least about 18.0 ksi√in.

Embodiment 13: The earth-boring tool of Embodiment 11, wherein the at least one hardfacing material has a composition exhibiting a wear resistance number of at least about 6.0 and a fracture toughness $K_{Ic}$ of at least about 15.0 ksi√in.

Embodiment 14: The earth-boring tool of any one of Embodiments 11 through 13, wherein the hardfacing material has a composition exhibiting a fracture toughness $K_{Ic}$ of y and a wear resistance number of x, wherein $y \geq 17.686 - 2.565 * \ln(|x-2.813|)$.

Embodiment 15: The earth-boring tool of any one of Embodiments 11 through 14, wherein the cobalt-based metal alloy comprises between about 5.0 wt % ruthenium and about 45.0 wt % ruthenium.

Embodiment 16: The earth-boring tool of Embodiment 15, wherein the cobalt-based metal alloy comprises between about 20.0 wt % ruthenium and about 45.0 wt % ruthenium.

Embodiment 17: The earth-boring tool of any one of Embodiments 11 through 16, wherein grains of the cobalt-based metal alloy have a hexagonal crystal structure.

Embodiment 18: A method of applying a hardfacing composition to a surface of an earth-boring tool, comprising: embedding grains of hard material in a molten cobalt-based metal alloy including at least about 5.0 wt % ruthenium on a surface of an earth-boring tool; and cooling and solidifying the molten cobalt-based metal alloy with the grains of hard material embedded therein.

Embodiment 19: The method of Embodiment 18, further comprising formulating the hardfacing composition to exhibit a fracture toughness $K_{Ic}$ of y and a wear resistance number of x, wherein $y \geq 17.686 - 2.565 * \ln(|x - 2.813|)$.

Embodiment 20: The method of Embodiment 18 or Embodiment 19, further comprising formulating the hardfacing composition to comprise between about 20.0 wt % ruthenium and about 45.0 wt % ruthenium.

Although the foregoing description contains many specifics, these are not to be construed as limiting the scope of the present invention, but merely as providing certain embodiments. Similarly, other embodiments of the disclosure may be devised that do not depart from the scope of the present invention. For example, features described herein with reference to one embodiment also may be provided in others of the embodiments described herein. The scope of the invention is, therefore, indicated and limited only by the appended claims and their legal equivalents, rather than by the foregoing description. All additions, deletions, and modifications to the invention, as disclosed herein, which fall within the meaning and scope of the claims, are encompassed by the present invention.

What is claimed is:

1. A method of applying a hardfacing composition to a surface of an earth-boring tool, comprising:
   suspending grains of hard material in a molten cobalt-based metal alloy including at least about 5.0 wt % ruthenium on a surface of an earth-boring tool; and
   cooling and solidifying the molten cobalt-based metal alloy with the grains of hard material suspended therein.

2. The method of claim 1, further comprising formulating the hardfacing composition to exhibit a fracture toughness $K_{Ic}$ of y and a wear resistance number of x, wherein $y \geq 17.686 - 2.565 * \ln(|x - 2.813|)$.

3. The method of claim 1, further comprising formulating the hardfacing composition to comprise between about 5.0 wt % ruthenium and about 45.0 wt % ruthenium.

4. The method of claim 3, further comprising formulating the hardfacing composition to comprise between about 20 wt % ruthenium and about 45 wt % ruthenium.

5. The method of claim 1, further comprising formulating the hardfacing composition to exhibit a wear resistance number of at least about 6.0 and a fracture toughness $K_{Ic}$ of at least about 15.0 ksi √in.

6. The method of claim 1, further comprising formulating the hardfacing composition to exhibit a wear resistance number of at least about 4.0 and a fracture toughness $K_{Ic}$ of at least about 18.0 ksi √in.

7. The method of claim 1, further comprising formulating the hardfacing composition to comprise between about 10.0 wt % cobalt-based metal alloy and about 50.0 wt % cobalt-based metal alloy.

8. The method of claim 1, further comprising formulating the cobalt-based metal alloy to comprise a hexagonal crystal structure.

9. The method of claim 1, further comprising formulating the grains of hard material to comprise at least one of a transition metal carbide, a transition metal nitride, and a transition metal oxide.

10. The method of claim 1, further comprising formulating the grains of hard material to comprise tungsten carbide.

11. The method of claim 1, wherein suspending grains of hard material in the molten cobalt-based metal alloy comprises melting a welding rod, the welding rod comprising a cylindrical body of cobalt-based metal alloy and particles of hard material disposed within the cylindrical body.

12. The method of claim 11, wherein melting the welding rod comprises using one of a metal-inert gas welding process, a tungsten-inert gas welding process, or a plasma-transferred arc welding process.

13. The method of claim 1, wherein suspending grains of hard material in the molten cobalt-based metal alloy comprises melting a powder mixture comprising particles of a cobalt-based metal alloy and particles of hard material through a flame spray nozzle.

\* \* \* \* \*